(12) United States Patent
Brooks et al.

(10) Patent No.: US 7,198,586 B2
(45) Date of Patent: Apr. 3, 2007

(54) TRANSMISSION HAVING MULTIPLE RATIO PLANETARY GEAR UNIT IN SERIES WITH AN AUXILIARY GEAR UNIT

(75) Inventors: Bert Brooks, Rochester Hills, MI (US); Johann Kirchhoffer, Köln (DE); Ruediger Volkert, Cologne (DE)

(73) Assignee: Ford Motor Company, Dearborn, MI (US)

( * ) Notice: Subject to any disclaimer, the term of this patent is extended or adjusted under 35 U.S.C. 154(b) by 244 days.

(21) Appl. No.: 11/010,075

(22) Filed: Dec. 10, 2004

(65) Prior Publication Data

US 2006/0128519 A1 Jun. 15, 2006

(51) Int. Cl.
F16H 3/44 (2006.01)
F16H 3/62 (2006.01)
(52) U.S. Cl. .................... 475/280; 475/276
(58) Field of Classification Search ............... 475/276, 475/277, 278, 280, 281, 903, 282, 283, 284, 475/285, 286, 287, 288, 289, 207, 209, 218; 74/329, 330, 331
See application file for complete search history.

(56) References Cited

U.S. PATENT DOCUMENTS

| | | | |
|---|---|---|---|
| 4,615,240 A * | 10/1986 | Weiss | 475/205 |
| 4,938,097 A | 7/1990 | Pierce | |
| 4,966,050 A | 10/1990 | Schulz et al. | |
| 5,106,352 A | 4/1992 | Lepelletier | |
| 5,421,222 A * | 6/1995 | Stine et al. | 74/745 |
| 5,474,503 A | 12/1995 | Debler et al. | |
| 5,584,775 A * | 12/1996 | Miura et al. | 475/200 |
| 5,642,283 A | 6/1997 | Schulz et al. | |
| 5,743,825 A | 4/1998 | Park | |
| 5,755,637 A | 5/1998 | Park | |
| 5,835,875 A | 11/1998 | Kirchhoffer et al. | |
| 5,902,213 A * | 5/1999 | Tsutsui et al. | 477/155 |
| 6,022,288 A * | 2/2000 | Cho | 475/276 |
| 6,746,359 B2 * | 6/2004 | Kang et al. | 475/276 |
| 2004/0266580 A1 * | 12/2004 | Stevenson | 475/282 |

* cited by examiner

Primary Examiner—Roger Pang
(74) Attorney, Agent, or Firm—David B. Kelley; MacMillan Sobanski & Todd (57) ABSTRACT

A multiple ratio transmission having a planetary primary gear unit producing forward ratios and a reverse ratio, and a planetary auxiliary gear unit in series with the primary gear unit producing a direct drive ratio and either an underdrive ratio or an overdrive ratio. The transmission produces six or seven forward ratios and two reverse ratios by combining the ratios of the primary and auxiliary gear units. Five friction clutches and brakes plus one one-way clutch control operation of the primary unit, and operation of the auxiliary unit is controlled by a clutch and a brake plus one one-way clutch. The same six or seven ratios can be achieved with a total of seven friction clutches and brakes in the primary and auxiliary unit by deleting the one-way clutches.

10 Claims, 5 Drawing Sheets

| Overall Transmission | | | Primary Unit 30 | | | | | | | Auxiliary Underdrive Unit 62 | | | |
|---|---|---|---|---|---|---|---|---|---|---|---|---|---|
| Gears | Overall Ratios | Ratio Steps | Fwd. 46 | Low/Rev. 50 | Int. Band 56 | Dir. 48 | Rev. CL 60 | Low OWC 54 | Ratios | Aux. Dir. 76 | Aux. Coast 78 | Aux. OWC 80 | Ratios |
| 1 | 4.25 | - | X | | | | | X | 3.02 | | | X | 1.40 |
| 2 | 3.02 | 1.40 | X | | | | | X | 3.02 | X | | O/R | 1.00 |
| 3 | 2.21 | 1.37 | X | | X | | | O/R | 1.58 | | | X | 1.40 |
| 4 | 1.40 | 1.58 | X | | | X | | O/R | 1.00 | X | | X | 1.40 |
| 5 | 1.00 | 1.40 | X | | X | X | | O/R | 1.00 | X | | O/R | 1.00 |
| 6 | 0.72 | 1.40 | | | | X | | O/R | 0.72 | X | | O/R | 1.00 |
| R1 | -3.53 | - | | X | | | X | - | -2.51 | | X | - | 1.40 |
| R2 | -2.51 | 1.40 | | X | | | X | - | -2.51 | X | | O/R | 1.00 |

*Figure 2*

| Gear Unit 30 | Sun | Ring | Pinion |
|---|---|---|---|
| Set 1 | 42 | 85 | 20 |
| Set 2 | 39 | 98 | 30 |
| Auxiliary Underdrive Unit 62 | | | |
| Set 3 | 38 | 94 | 25 |

*Figure 3*

| Overall Transmission | | | 4-Speed Unit 30 | | | | | | | Auxiliary Overdrive Unit 100 | | | |
|---|---|---|---|---|---|---|---|---|---|---|---|---|---|
| Gears | Overall Ratios | Ratio Steps | Fwd. 46 | Low/Rev. 50 | Int. Brake 56 | Dir. Clutch 48 | Rev. Clutch 60 | Low OWC 54 | Ratios | Aux. OD Brake 112 | Aux. Coast 114 | Aux. OWC 116 | Ratios |
| 1 | 3.02 | | X | (X) | | | | X | 3.02 | | (X) | X | 1.00 |
| 2 | 2.15 | 1.40 | X | (X) | X | | | X | 3.02 | X | | O/R | 0.71 |
| 3 | 1.58 | 1.37 | X | | | | | O/R | 1.58 | | (X) | X | 1.00 |
| 4 | 1.00 | 1.58 | X | | | X | | O/R | 1.00 | | (X) | X | 1.00 |
| 5 | 0.71 | 1.40 | X | | X | X | | O/R | 1.00 | X | | O/R | 0.71 |
| 6 | 0.51 | 1.40 | | | | X | | O/R | 0.72 | X | | O/R | 0.71 |
| R1 | -2.51 | | | X | | | X | | -2.51 | | X | 1.00 | |
| R2 | -1.79 | 1.40 | | X | | | X | | -2.51 | X | | O/R | 0.71 |

*Figure 5*

| Gear Unit 30 | | | |
|---|---|---|---|
| | Sun | Ring | Pinion |
| Set 1 | 42 | 85 | 20 |
| Set 2 | 39 | 98 | 30 |
| Auxiliary Underdrive Unit 100 | | | |
| Set 3 | 38 | 94 | 25 |

*Figure 6*

| Overall Transmission | | | 4-Speed Unit 30 | | | | | | | Auxiliary Underdrive Unit 62 | | | |
|---|---|---|---|---|---|---|---|---|---|---|---|---|---|
| Gears | Overall Ratios | Ratio Steps | Fwd. 46 | Low/ Rev. 50 | Int. Brake 56 | Dir. Clutch 48 | Rev. Clutch 60 | Low OWC 54 | Ratios | Aux. Dir. 76 | Aux. Coast 78 | Aux. OWC 80 | Ratios |
| 1 | 5.38 |  | X | (X) |  |  |  | X | 3.83 |  | (X) | X | 1.40 |
| 2 | 3.83 | 1.40 | X | (X) |  |  |  | X | 3.83 | X |  | O/R | 1.00 |
| 3 | 2.71 | 1.42 | X |  | X |  |  | O/R | 1.93 |  | (X) | X | 1.40 |
| 4 | 1.93 | 1.40 | X |  | X |  |  | O/R | 1.93 | X |  | O/R | 1.00 |
| 5 | 1.40 | 1.37 | X |  |  | X |  | O/R | 1.00 |  | (X) | X | 1.40 |
| 6 | 1.00 | 1.40 | X |  |  | X |  | O/R | 1.00 | X |  | O/R | 1.00 |
| 7 | 0.67 | 1.49 |  |  | X | X |  | O/R | 0.67 | X |  | O/R | 1.40 |
| R1 | -2.88 |  |  | X |  |  | X |  | -2.05 |  | X |  | 1.40 |
| R2 | -2.05 | 1.40 |  | X |  |  | X |  | -2.05 | X |  | O/R | 1.00 |

*Figure 7*

| Gear Unit 30 | Sun | Ring | Pinion |
|---|---|---|---|
| Set 1 | 30 | 85 | 20 |
| Set 2 | 39 | 80 | 30 |
| Auxiliary Underdrive Unit 62 | | | |
| Set 3 | 38 | 94 | 25 |

| Overall Transmission | | | 4-Speed Unit 30 | | | | | | | Auxiliary Overdrive Unit 100 | | | |
|---|---|---|---|---|---|---|---|---|---|---|---|---|---|
| Gears | Overall Ratios | Ratio Steps | Fwd. 46 | Low/Rev. 50 | Int. Brake 56 | Dir. Clutch 48 | Rev. Clutch 60 | Low OWC 54 | Ratios | Aux. OD Brake 112 | Aux. Coast 114 | Aux. OWC 116 | Ratios |
| 1 | 3.83 |  | X | (X) |  |  |  | X | 3.83 |  | (X) | X | 1.00 |
| 2 | 2.73 | 1.40 | X | (X) | X |  |  | X | 3.83 | X |  | O/R | 0.71 |
| 3 | 1.93 | 1.42 | X |  | X |  |  | O/R | 1.93 |  | (X) | X | 1.00 |
| 4 | 1.37 | 1.40 | X |  | X |  |  | O/R | 1.93 | X |  | O/R | 0.71 |
| 5 | 1.00 | 1.37 | X |  |  | X |  | O/R | 1.00 |  | (X) | X | 1.00 |
| 6 | 0.71 | 1.40 | X |  |  | X |  | O/R | 1.00 | X |  | O/R | 0.71 |
| 7 | 0.48 | 1.49 |  |  | X | X |  |  | 0.67 | X |  | O/R | 0.71 |
| R1 | -2.05 |  |  | X |  |  | X |  | -2.05 |  | X |  | 1.00 |
| R2 | -1.46 | 1.40 |  | X |  |  | X |  | -2.05 | X |  | O/R | 0.71 |

Figure 10

| Gear Unit 30 | Sun | Ring | Pinion |
|---|---|---|---|
| Set 1 | 30 | 85 | 20 |
| Set 2 | 39 | 80 | 30 |
| Auxiliary Underdrive Unit 100 | | | |
| Set 3 | 38 | 94 | 25 |

TRANSMISSION HAVING MULTIPLE RATIO PLANETARY GEAR UNIT IN SERIES WITH AN AUXILIARY GEAR UNIT

BACKGROUND OF THE INVENTION

This invention relates to the field of power transmissions for motor vehicles. More particularly, it pertains to an automatic transmission for an automotive vehicle having an auxiliary gear unit and a primary gear unit. The auxiliary gear unit produces a direct drive ratio and can either underdrive or overdrive its output.

Various techniques have been used to increase the number of gear ratios produced by a multiple speed ratio automatic transmission that employs a simple planetary gearset arranged in series with a compound planetary gearset. For example, U.S. Pat. Nos. 5,755,637 and 5,43,825 disclose an automatic transmission for a motor vehicle that includes a compound planetary gearset coaxial with an input shaft and operating under control of clutches and brakes to establish first to fourth forward drive ratios. A simple planetary gear set coaxial with an output shaft and provides a fifth forward drive ratio by further increasing the pre-established fourth ratio. A chain and sprocket coupler delivers rotary power from the compound planetary gearset to the simple planetary gearset.

There is, however, a need for automatic transmissions to produce an increasing larger number of gear ratios and wider ratio spans. Larger ratio spans improve drive-away performance and fuel economy at the same time. Preferably a six-speed transmission would provide a ratio span of at least 6.0, and a seven-speed transmission would have a ratio span of 8.0 or greater.

It is desired that a transmission having six or seven forward ratios should provide also multiple reverse gear ratios to enhance performance in winter driving conditions. Preferably, a transmission would also provide engine braking at least optionally over a range of forward ratios.

SUMMARY OF THE INVENTION

This invention relates to a transmission kinematic arrangement capable of achieving multiple forward gear ratios and two reverse ratios with two planetary gear units arranged in series and controlled by a minimum number of friction clutches and brakes.

The transmission can operate in six or seven forward speed ratios with few structural changes to the components or the assembly. The two available reverse gear ratios provide a preferred range of options that is particularly useful to an operator in winter driving or whenever road conditions are slippery. Auxiliary coast clutches arranged in series with overrunning one-way clutches provide engine braking over a range of suitable forward ratios.

The overall ratio span produced by the transmission with gears and pinions having-preferred sizes is 6.0 for the six-speed version and 8.0 for the seven-speed version. Larger ratio spans improve drive-away performance and improve fuel economy compared to a transmission having a narrower span of ratios.

A multiple ratio transmission according to this invention having these and other advantages includes a planetary primary gear unit producing forward ratios and a reverse ratio, and a planetary auxiliary gear unit in series with the primary gear unit producing a direct drive ratio and either an underdrive ratio or an overdrive ratio. The transmission produces six or seven forward ratios and two reverse ratios by combining the ratios of the primary and auxiliary gear units. Five friction clutches and brakes control operation of the primary unit, and operation of the auxiliary unit is controlled by a clutch and a brake.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
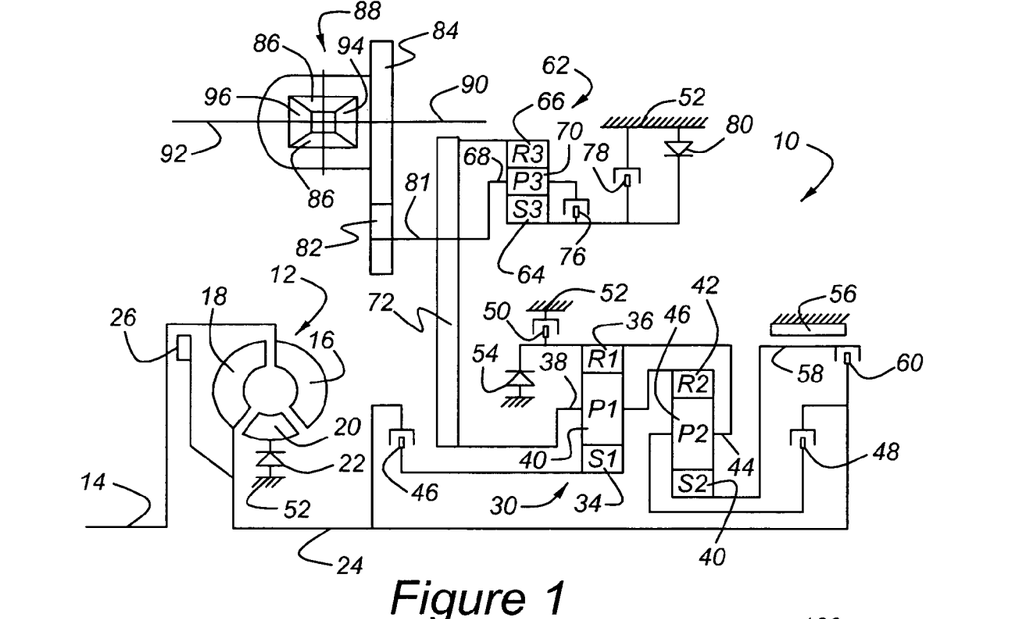
FIG. 1 is a schematic diagram of a transmission according to this invention that includes an auxiliary gear unit for alternately producing a direct drive ratio and an underdrive ratio.

Referring now to the drawings, there is illustrated in FIG. 1 a transmission 10 having a hydrokinetic torque converter 12 driveably connected to an engine crankshaft 14. The torque converter includes three bladed wheels: an impeller 16, turbine 18, and stator 20, which together define a toroidal fluid flow circuit within the casing of the torque converter. The stator 20 is supported on an overrunning brake 22, which anchors the stator to the shaft to prevent rotation of the stator in a direction opposite to the direction of rotation of the impeller and to permit free-wheeling rotation in the opposite direction. Turbine 18 is connected to a transmission input 24. A bypass or lock-up clutch 26, located between crankshaft 14 and input 24, direct mechanically connects the engine shaft and input when the clutch is engaged. When clutch 26 is disengaged, engine shaft 14 and input 24 are hydrodynamically connected through operation of the torque converter 12.

A primary gear unit 30 includes two interconnected planetary gearsets. The first gearset includes a sun gear 34, ring gear 36, carrier 38 and planetary pinions 40, rotatably supported on carrier 38 and in continuous meshing engagement with sun gear 34 and ring gear 36. The second gearset includes a sun gear 40, ring gear 42, carrier 44 and planet pinions 46, rotatably supported on carrier 44 and in continuous meshing engagement with sun gear 40 and ring gear 42.

A forward clutch 46, a hydraulically actuated friction clutch, releasably connects input 24 and sun gear 34. A direct clutch 48, a hydraulically actuated friction clutch, releasably connects input 24 and carrier 44. A low/reverse brake 50, releasably holds ring gear 36 and carrier 44 fixed against rotation on the transmission housing 52. An overrunning low clutch 54, arranged in parallel with clutch 50, provides a one-way drive connection between housing 52 and ring gear 36 and carrier 44 in one rotary direction and permits ring gear 36 and carrier 44 to rotate relative to the housing in the opposite direction. An intermediate brake 56, a band brake, releasably holds sun gear 40 and drum 58 fixed against rotation on the transmission housing 52. A reverse clutch 60, a hydraulically actuated friction clutch, releasably connects input 24 and drum 58, which is driveably secured to sun gear 40. Carrier 44 is secured to ring gear 36. Carrier 38 is secured to ring gear 42.

An auxiliary planetary gear unit 62 alternately produces a direct drive ratio or an underdrive ratio depending on the engaged or disengaged state, respectively, of an auxiliary clutch. Gear unit 62 includes a sun gear 64, ring gear 66, carrier 68 and planetary pinions 70, rotatably supported on carrier 68 and in continuous meshing engagement with sun gear 64 and ring gear 66. Ring gear 66 is driveably connect to carrier 38, by a chain drive 72 or a set of meshing gears.

An auxiliary direct clutch 76, a hydraulically actuated friction clutch, releasably connects sun gear 64 and carrier 68. An auxiliary one-way brake 80, arranged in parallel with coast brake 78, provides a one-way drive connection between housing 52 and sun gear 64 in one rotary direction and permits sun gear 64 to rotate relative to the housing in the opposite direction. The auxiliary coast brake 78, a hydraulically actuated friction brake, releasably connects sun gear 64 and the housing 52.

Carrier 68 is driveably connected to a pinion 82 of a final drive unit, the pinion being in meshing engagement with a gear 84, which is driveably connected to the central bevel gears 86 of a differential mechanism 88. The differential mechanism transmits power differentially between carrier 68 and the driven wheels of the vehicle through axle shafts 90, 92 and side bevel gears 94, 96, which mesh with bevel gears 86.

Figure 2:
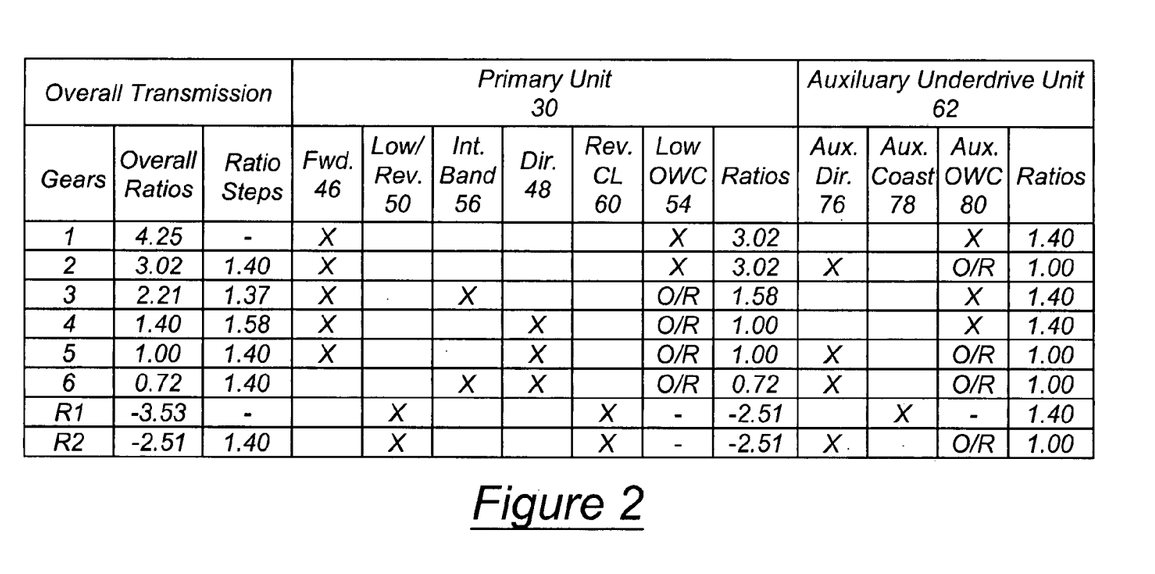
FIG. 2 is a chart indicating the status of the clutches and brakes for each forward and reverse ratio and the magnitude of the gear ratios and the ratio steps for the transmission of FIG. 1.

FIG. 2 is a chart indicating the engaged and disengaged status of the clutches and brakes corresponding to each forward ratio and reverse ratio produced by the transmission of FIG. 1. The primary unit 30 produces four forward ratios and a reverse ratio; the auxiliary unit 62 produces a direct drive ratio and an underdrive ratio; and the transmission produces six forward ratios and two reverse ratios. In FIG. 2, "X" indicates engagement of the friction clutches and brakes and transmission of torque by the overrunning clutches and brakes. "O/R" indicates a one-way clutch or brake is overrunning. A blank indicates there is no relative rotation across the clutch or brake, or that no torque is being transmitted by the clutch or brake.

The first forward ratio is produced by engaging forward clutch 46, which causes low one-way clutch 54 to drive and hold ring gear 36 and carrier 44 fixed against rotation, and auxiliary one-way brake 80 to drive and hold sun gear 64 fixed against rotation. This action causes the primary unit 30 to produce its first forward ratio and the auxiliary unit 62 to operate in an underdrive ratio. Sun gear 34 is driveably connected to input 24, ring gear 36 is fixed against rotation, and carrier 38 is underdriven in relation to the speed of input 24. In the auxiliary unit, ring gear 66 is driven at the speed of carrier 38, sun gear 64 is held against rotation, and an additional speed reduction occurs in auxiliary gear unit 62, whereby carrier 68 underdrives output 81 in relation to the speed of input 24.

An upshift to the second forward ratio results by switching the auxiliary unit from underdrive to direct drive operation by engaging the auxiliary direct clutch 76, which causes the auxiliary one-way clutch 80 to overrun and driveably connects carrier 68 and sun gear 64 mutually. This action allows the primary unit 30 to continue to produce its first forward ratio and the auxiliary unit 62 to operate in a direct drive ratio. The primary unit 30 underdrives its output, carrier 38, through the same torque path as in the first forward transmission ratio, and the auxiliary gear unit 62 is locked-up due to the drive connection between carrier 68 and sun gear 64 through the auxiliary direct clutch 76. Output 81 and carrier 68 are underdriven at the same speed as carrier 38.

The third forward ratio is produced by engaging forward clutch 46 and intermediate band 56 and by operating the auxiliary unit 62 in the underdrive ratio. This action causes the primary unit 30 to produce its second forward ratio. With sun gear 40 held fixed against rotation, thereby causing one-way-clutch 54 to overrun, carrier 38 is underdriven in relation to the speed of input 24 and sun gear 34, and ring gear 66 is driven at that underdriven speed. The auxiliary gear unit 62 further reduces the speed of carrier 68 and output 81 in relation to the speed of the ring gear 66 by releasing auxiliary direct clutch 76 at the same time.

The fourth forward ratio is produced when forward clutch 46 is engaged, direct clutch 48 is engaged, and intermediate band 46 is released, thereby causing one-way clutch 54 to continue over-rolled and to keep the auxiliary unit 62 in the underdrive ratio operation mode. This action causes the primary unit 30 to produce its third forward ratio, a direct drive ratio. Sun gear 34 and ring gear 36 rotate at the speed of input 24, and carrier 38 and ring gear 66 rotate at the speed of input 24. The auxiliary unit 62 produces a speed reduction because sun gear 64 is fixed against rotation and the output 81 is underdriven in relation to the speed of input 24.

The fifth forward ratio is produced when the primary unit 30 operates in its third forward ratio and auxiliary unit 62 operates in its direct drive ratio. With the transmission 10 so disposed, primary unit 30 is locked-up because ring gear 36 and sun gear 34 are driveably connected to input 24 through direct clutch 48 and forward clutch 46, respectively. Similarly, the auxiliary gear unit 62 is locked-up because carrier 68 is driveably connected to sun gear 64 through the auxiliary direct clutch 76. Therefore, output 81 is driven at the speed of input 24.

The sixth forward ratio is produced by disengaging forward clutch 46, engaging intermediate band 56 and direct clutch 48, and by operating auxiliary unit 62 in its direct drive ratio. This action causes the primary unit 30 to produce its fourth forward ratio. With sun gear 40 fixed against rotation and providing a torque reaction, input 24 is driveably connected to carrier 44 due to the engagement of direct clutch 48, and the first output, ring gear 42 and carrier 38, is overdriven in relation to the speed of input 24. The auxiliary gear unit 62 is locked-up due to the engagement of auxiliary direct clutch 76, and the output 81 is overdriven relative to the speed of input 24

The primary unit 30 produces a first reverse ratio by engaging low/brake 50 and reverse clutch 60. Brake 50 holds carrier 44 and ring gear 36 fixed against rotation; reverse clutch 60 driveably connects input 24 to sun gear 40. This underdrives the first output, ring gear 42 and carrier 38, in a reverse direction relative to input 24. Operating the primary unit 30 in its reverse ratio and operating the auxiliary unit 62 in its underdrive ratio by engaging auxiliary coast clutch 78 produce a first transmission reverse ratio. Operating the primary unit 30 in its reverse ratio and operating the auxiliary unit 62 in its direct drive ratio by disengaging auxiliary coast clutch 78 and engaging auxiliary direct clutch 76 produce a second transmission reverse ratio.

Figure 3:
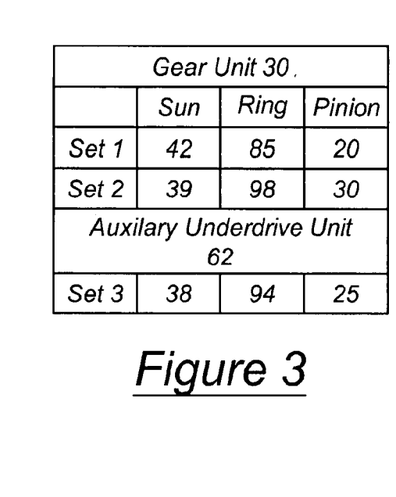
FIG. 3 is a chart containing a preferred number of teeth of each gear and pinion of the transmission of FIG. 1.

FIG. 2 shows the gear ratios and ratio steps produced by the primary and auxiliary gear units of the transmission of FIG. 1 when the gears and pinions have the number of gear teeth indicated in FIG. 3. FIG. 2 also contains the overall ratios produced by the transmission of FIG. 1 and the ratio steps for an example of this invention in which the gears and pinions have the number of teeth indicated in the chart of FIG. 3. The overall transmission ratio span is 5.94.

The transmission of FIG. 1 can operate as described above upon deleting the low/reverse one-way brake 54 from primary unit 30 and one-way brake 80 from auxiliary unit 62. The low/reverse brake 50 is engaged instead of producing a drive connection through low one-way brake 54 in the first and second forward ratios. Otherwise, the primary unit 30 operates as discussed above with reference to FIG. 1. Similarly, the auxiliary unit 62 produces its direct drive ratio by engaging the low brake 78 instead of producing a drive connection through the one-way brake 80 in the first, third and fourth forward ratios and in the first reverse ratio. Otherwise, the auxiliary unit 62 operates as discussed above with reference to FIG. 1.

Figure 4:
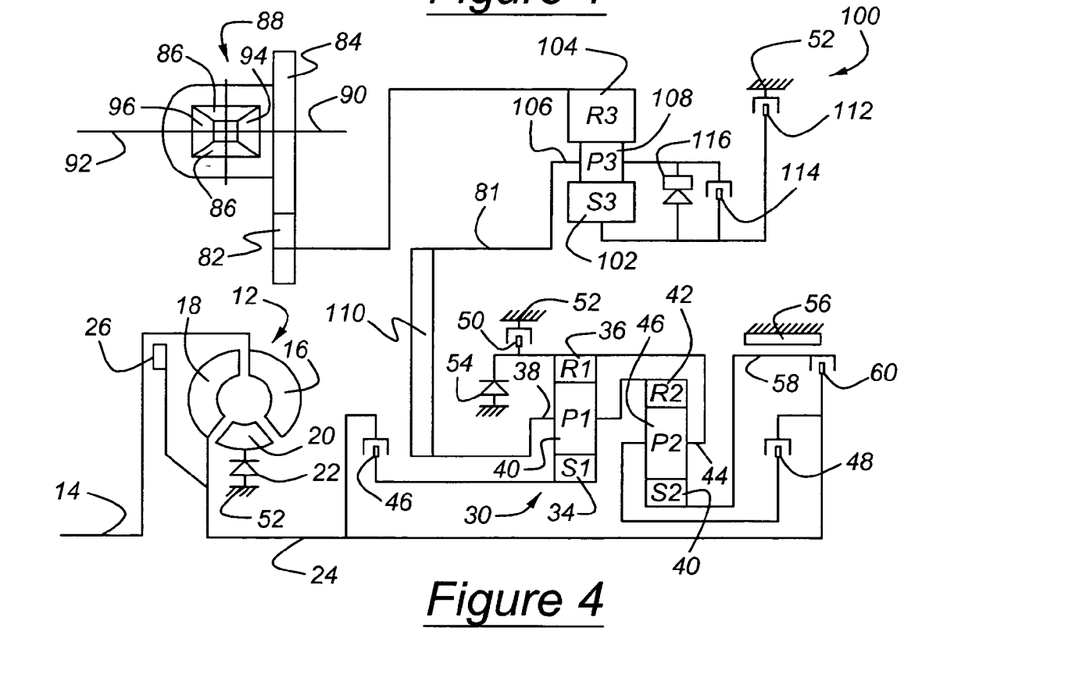
FIG. 4 is a schematic diagram of another transmission according to this invention that includes an auxiliary gear unit for alternately producing a direct drive ratio and an overdrive ratio.

FIG. 4 is a schematic diagram of a transmission identical to that of FIG. 1 except that it includes an auxiliary gear unit 100, which is substituted for the auxiliary gear unit 62 of FIG. 1. Gear unit 100 alternately produces a direct drive ratio and an overdrive ratio of the speed of input 24 in relation to the speed of its input, which is carrier 106. Gear unit 100 includes a sun gear 102, ring gear 104, carrier 106, and planetary pinions 108, rotatably supported on carrier 106 and in continuous meshing engagement with sun gear 102 and ring gear 104. Carrier 106 is driveably connect to carrier 38 by a chain drive 110 or a set of meshing gears, and the output of gearset 100, taken at ring gear 104, is driveably connected to a pinion 82 of the final drive unit.

An auxiliary overdrive brake 112, a hydraulically actuated friction brake, releasably secures sun gear 102 against rotation on the housing 52. An auxiliary coast clutch 114 releasably connects sun gear 102 and carrier 106. An auxiliary one-way clutch 116, arranged in parallel with clutch 114, provides a one-way drive connection between sun gear 102 and carrier 106.

Figure 5:
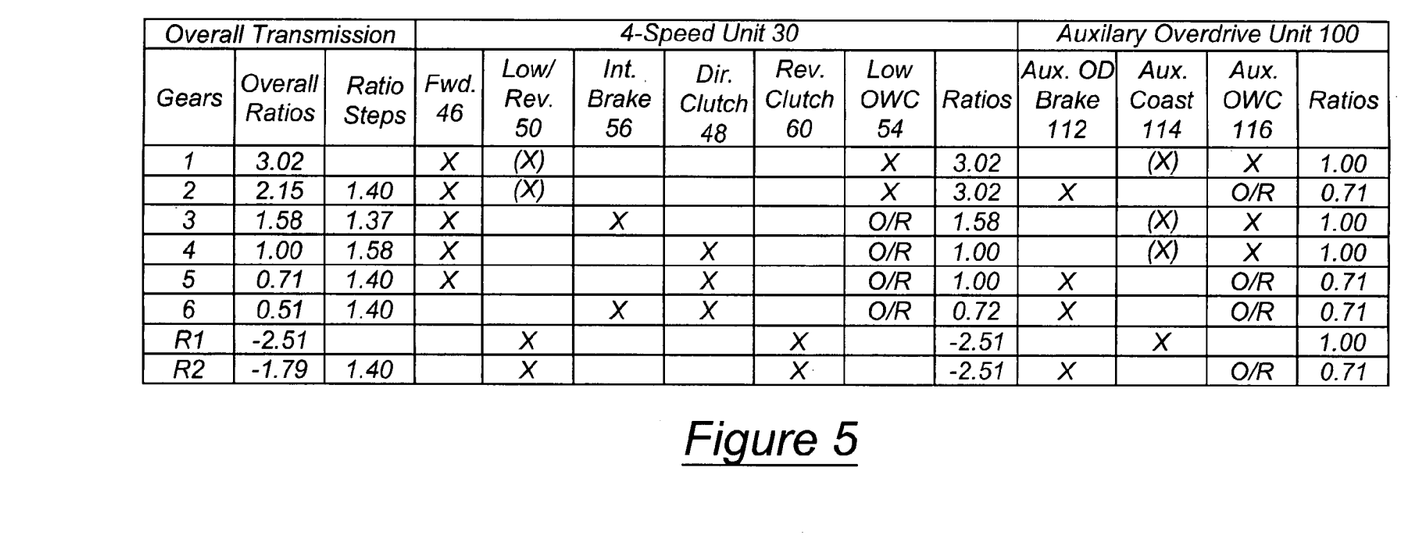
FIG. 5 is a chart indicating the status of the clutches and brakes for each forward and reverse ratio and the magnitude of the gear ratios and the ratio steps for the transmission of FIG. 4.

FIG. 5 is a chart indicating the engaged and disengaged status of the clutches and brakes corresponding to each forward and reverse gear ratio of the transmission of FIG. 4. In FIG. 5, "X" indicates engagement of the friction clutches and brakes and transmission of torque by the overrunning clutches and brakes. "O/R" indicates a one-way clutch or brake is overrunning. A blank indicates there is no relative rotation across the clutch or brake, or that no torque is being transmitted by the clutch or brake. "( )" indicates a clutch is engaged to provide engine braking during a coast condition, i.e., when torque is transmitted from the driven wheels to the engine crankshaft 14.

The primary unit 30 of the transmission of FIG. 4 produces four forward ratios and a reverse ratio identically as described above with reference to the primary unit 30 of the transmission of FIG. 1. The auxiliary unit 100 of the embodiment of FIG. 4 produces a direct drive ratio and an overdrive ratio. The transmission of FIG. 4 produces six forward ratios and two reverse ratios; however, the ratios of the auxiliary unit 100 are combined with the forward ratios produced by the primary unit 30 as shown in FIG. 5, a different combination than that of FIG. 1.

Figure 6:
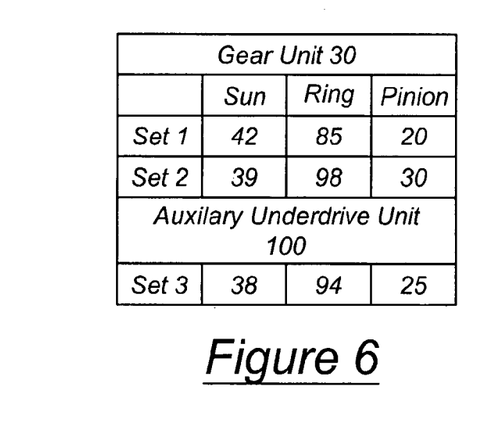
FIG. 6 is a chart containing a preferred number of teeth of each gear and pinion of the transmission of FIG. 4.

FIG. 5 contains the ratios produced by the primary and auxiliary gear units 30, 100 of the transmission of FIG. 4, the overall ratios produced by the transmission, and ratio steps when the gears and pinions have the number of gear teeth indicated in FIG. 6. The overall ratio span is 5.94.

The transmission of FIG. 4 can operate as described above upon deleting the low one-way brake 54 from primary unit 30 and one-way clutch 116 from auxiliary unit 100. The low/reverse brake 50 is engaging instead of producing a drive connection through low one-way brake 54. Otherwise, the primary unit 30 operates as discussed above with reference to FIG. 4. Similarly, the auxiliary unit 100 produces its direct drive ratio by engaging the low clutch 114 instead of producing a drive connection through the one-way clutch 116. Otherwise, the auxiliary unit 100 operates as discussed above with reference to FIG. 4.

Figure 7:
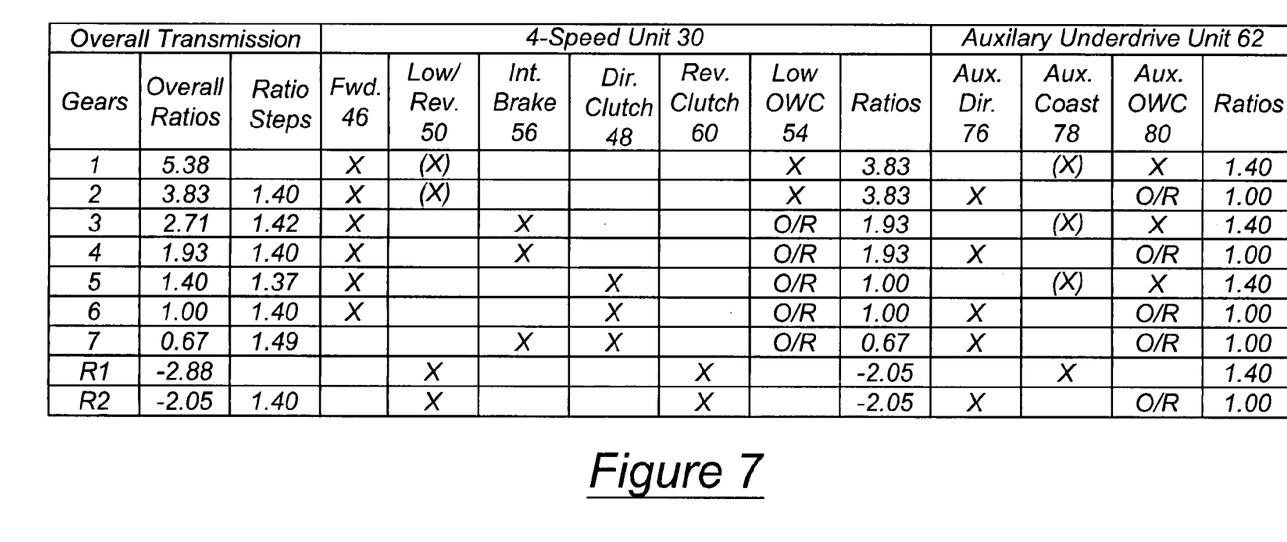
FIG. 7 is a chart indicating the status of the clutches and brakes for each forward and reverse ratio and the magnitude of the gear ratios and the ratio steps for a seven speed version of the transmission of FIG. 1.

FIG. 7 is a chart indicating the engaged and disengaged status of the clutches and brakes corresponding to each forward ratio and reverse ratio produced by a seven speed version of the transmission of FIG. 1. The primary unit 30 produces four forward ratios and a reverse ratio; the auxiliary unit 62 produces a direct drive ratio and an underdrive ratio; and the transmission produces seven forward ratios and two reverse ratios. In FIG. 7, "X" indicates engagement of the friction clutches and brakes and transmission of torque by the overrunning clutches and brakes. "O/R" indicates a one-way clutch or brake is overrunning. A blank indicates there is no relative rotation across the clutch or brake, or that no torque is being transmitted by the clutch or brake. "( )" indicates a clutch is engaged to provide engine braking during a coast condition, i.e., when torque is transmitted from the driven wheels to the engine crankshaft 14.

The primary unit 30 operates as described above with reference to FIG. 1 by producing its first forward ratio in the first and second forward transmission ratios; by producing its second forward ratio in the third and fourth forward transmission ratios; by producing its third forward ratio, a direct drive ratio, in the fifth and sixth forward transmission ratios; and by producing its fourth forward ratio in the seventh forward transmission ratio.

The auxiliary unit 62 operates as described above by producing its underdrive ratio in the first, third and fifth forward transmission ratios; and by producing its direct drive ratio in the second, fourth, sixth and seventh forward transmission ratios. In this way, an addition ratio, the fourth transmission ratio, is added to the six transmission ratios described above with reference to FIG. 1.

Figure 8:
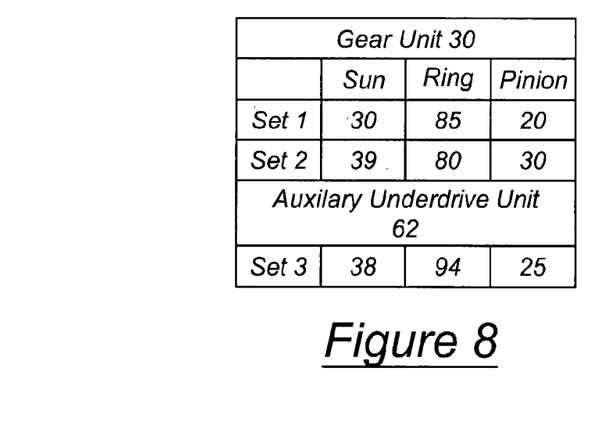
FIG. 8 is a chart containing a preferred number of teeth of each gear and pinion of the transmission of FIG. 7.

FIG. 7 contains the ratios produced by the primary and auxiliary gear units 30, 62 and the overall ratios produced by the seven-speed version of the transmission of FIG. 1 when the gears and pinions have the number of teeth indicated in FIG. 8.

The overall ratio span of the seven-speed transmission of FIG. 7 is 8.01.

The transmission of FIG. 7 can operate as described above upon deleting the low/reverse one-way brake 54 from primary unit 30 and one-way brake 80 from auxiliary unit 62. The low/reverse brake 50 is engaging instead of producing a drive connection through low one-way brake 54. Otherwise, the primary unit 30 operates as discussed above with reference to FIG. 1. Similarly, the auxiliary unit 62 produces its direct drive ratio by engaging the coast low brake 78 instead of producing a drive connection through the one-way brake 80 Otherwise the auxiliary unit 62 operates as discussed above with reference to FIG. 1.

Figure 9:
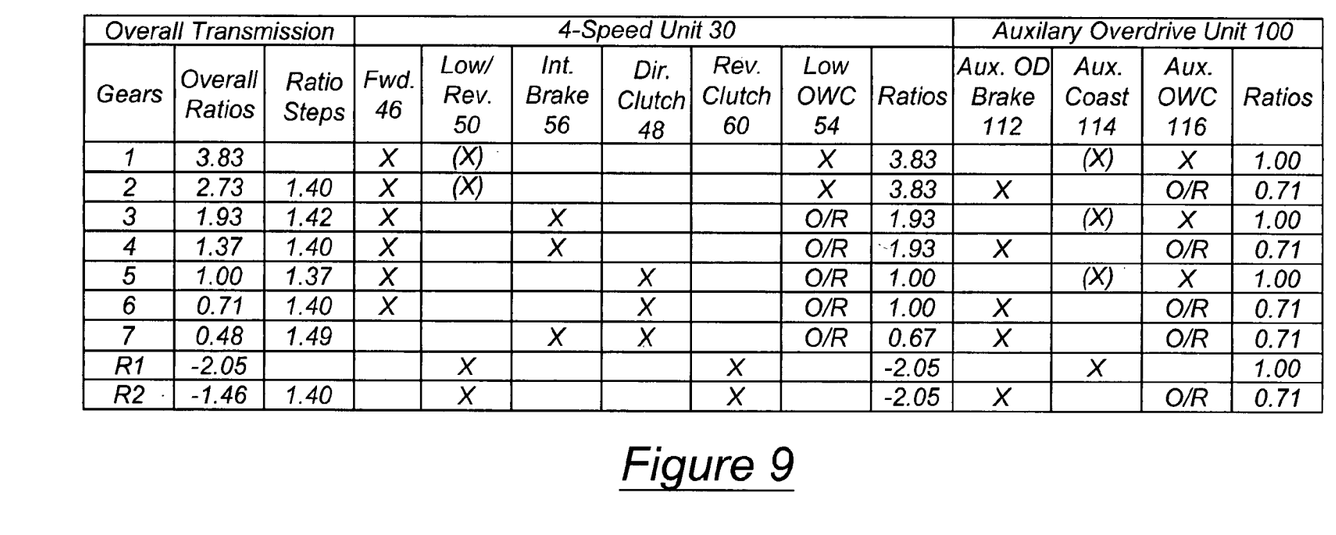
FIG. 9 is a chart indicating the status of the clutches and brakes for each forward and reverse ratio and the magnitude of the gear ratios and the ratio steps for a seven speed version of the transmission of FIG. 4.

FIG. 9 is a chart indicating the engaged and disengaged status of the clutches and brakes corresponding to each forward ratio and reverse ratio produced by a seven speed version of the transmission of FIG. 4. The primary unit 30 produces four forward ratios and a reverse ratio; the auxiliary unit 100 produces a direct drive ratio and an overdrive ratio; and the transmission produces seven forward ratios and two reverse ratios. In FIG. 9, "X" indicates engagement of the friction clutches and brakes and transmission of torque by the overrunning clutches and brakes. "O/R" indicates a one-way clutch or brake is overrunning. A blank indicates there is no relative rotation across the clutch or brake, or the clutch or brake is transmitting that no torque. "( )" indicates a clutch is engaged to provide engine braking during a coast condition, i.e., when torque is transmitted from the driven wheels to the engine crankshaft 14.

The primary unit 30 operates as described above with reference to FIG. 1 by producing its first forward ratio in the first and second forward transmission; by producing its second forward ratio in the third and fourth forward transmission ratios; by producing its third forward ratio, a direct drive ratio, in the fifth and sixth forward transmission ratios; and by producing its fourth forward ratio in the seventh forward transmission ratio.

The auxiliary unit 100 operates as described above with reference to FIG. 4 by producing its overdrive ratio in the second, fourth, sixth and seventh forward transmission ratios, and by producing its direct drive ratio in the first, third and fifth forward transmission ratios. In this way, an addition ratio, the fourth transmission ratio, is added to the six transmission ratios described above with reference to FIG. 4.

Figure 10:
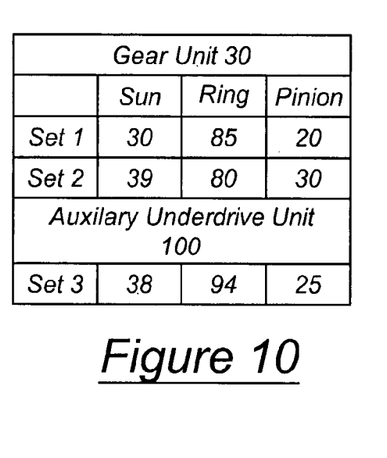
FIG. 10 is a chart containing a preferred number of teeth of each gear and pinion of the transmission of FIG. 12.

FIG. 9 contains the ratios produced by the primary and auxiliary gear units 30, 100 the overall ratios and ratio steps produced by the seven-speed version of the transmission of FIG. 4 when the gears and pinions have the number of teeth indicated in FIG. 10. The overall ratio span of the seven speed transmission is 8.01.

The transmission of FIG. 9 can operate as described above upon deleting the low one-way brake 54 from primary unit 30 and one-way clutch 116 from auxiliary unit 100. The low/reverse brake 50 is engaging instead of producing a drive connection through low one-way brake 54. Otherwise, the primary unit 30 operates as discussed above with reference to FIG. 4. Similarly, the auxiliary unit 100 produces its direct drive ratio by engaging the low clutch 114 instead of producing a drive connection through the one-way clutch 116. Otherwise, the auxiliary unit 100 operates as discussed above with reference to FIG. 4.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for operating a multiple speed ratio transmission that includes an input and an output, a primary gear unit driveably connected to the input and including a first output and producing forward ratios of a speed of the input to a speed of the first output, and an auxiliary gear unit driveably connected to the first output, located in a torque path between the first output and the output, and producing auxiliary ratios of a speed of the first output to a speed of the output, the auxiliary ratios including a direct drive ratio and an overdrive ratio, the method comprising the steps of:

producing a first forward speed ratio by operating the primary gear unit in a first forward ratio and the auxiliary gear in the direct drive ratio;

producing a second forward speed ratio by operating the primary gear unit in the first forward ratio and the auxiliary gear in the overdrive ratio;

producing a third forward speed ratio by operating the primary gear unit in a second forward ratio and the auxiliary gear in the direct drive ratio;

producing a fourth forward speed ratio by operating the primary gear unit in a third forward ratio and the auxiliary gear in the direct drive ratio;

producing a fifth forward speed ratio by operating the primary gear unit in the third forward ratio and the auxiliary gear in the overdrive ratio;

producing a sixth forward speed ratio by operating the primary gear unit in a fourth forward ratio and the auxiliary gear in the overdrive ratio.

2. The method of claim 1, further comprising the steps of:

producing a first reverse speed ratio by operating the primary gear unit in a reverse ratio and the auxiliary gear in the direct drive ratio.

3. The method of claim 1, further comprising the steps of:

producing a second reverse speed ratio by operating the primary gear unit in a reverse ratio and the auxiliary gear in the overdrive ratio.

4. The method of claim 1 wherein the steps of producing the fourth and fifth forward speed ratios further comprises operating the primary gear unit in a direct drive ratio.

5. The method of claim 1 wherein the step of producing the sixth forward speed ratio further comprises operating the primary gear unit in an overdrive forward ratio.

6. A method for operating a multiple speed ratio transmission that includes an input and an output, a primary gear unit driveably connected to the input and including a first output and producing multiple forward ratios of a speed of the input to a speed of the first output, and an auxiliary gear unit driveably connected to the first output, located in a torque path between the first output and the output, and producing auxiliary ratios of a speed of the first output to a speed of the output, the auxiliary ratios including a direct drive ratio and an overdrive ratio, the method comprising the steps of:

producing a first forward speed ratio by operating the primary gear unit in a first forward ratio and the auxiliary gear in the direct drive ratio;

producing a second forward speed ratio by operating the primary gear unit in the first forward ratio and the auxiliary gear in the overdrive ratio;

producing a third forward speed ratio by operating the primary gear unit in a second forward ratio and the auxiliary gear in the direct drive ratio;

producing a fourth forward speed ratio by operating the primary gear unit in the second forward ratio and the auxiliary gear in the overdrive ratio;

producing a fifth forward speed ratio by operating the primary gear unit in a third forward ratio and the auxiliary gear in the direct drive ratio;

producing a sixth forward speed ratio by operating the primary gear unit in the third drive ratio and the auxiliary gear in the overdrive ratio; and producing a seventh forward speed ratio by operating the primary gear unit in a fourth forward ratio and the auxiliary gear in the overdrive ratio.

7. The method of claim 6, further comprising the steps of:

producing a first reverse speed ratio by operating the primary gear unit in a reverse ratio and the auxiliary gear in the direct drive ratio.

8. The method of claim 6, further comprising the steps of:

producing a second reverse speed ratio by operating the primary gear unit in a reverse speed ratio and the auxiliary gear in the overdrive ratio.

9. The method of claim 6 wherein the steps of producing the fifth and sixth forward speed ratios further comprises operating the primary gear unit in a direct drive ratio.

10. The method of claim 6 wherein the step of producing the seventh forward speed ratio further comprises operating the primary gear unit in an overdrive forward ratio.

* * * * *